US012175938B2

(12) United States Patent
Tian et al.

(10) Patent No.: US 12,175,938 B2
(45) Date of Patent: Dec. 24, 2024

(54) PIXEL CIRCUIT, PIXEL DRIVING METHOD, DISPLAY SUBSTRATE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Xuewei Tian, Beijing (CN); Bo Yang, Beijing (CN); Shuai Xie, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/912,620

(22) PCT Filed: Nov. 11, 2021

(86) PCT No.: PCT/CN2021/130055
§ 371 (c)(1),
(2) Date: Mar. 29, 2023

(87) PCT Pub. No.: WO2022/174626
PCT Pub. Date: Aug. 25, 2022

(65) Prior Publication Data
US 2023/0206849 A1 Jun. 29, 2023

(30) Foreign Application Priority Data
Feb. 20, 2021 (CN) ......................... 202110194006.7

(51) Int. Cl.
*G09G 3/3258* (2016.01)

(52) U.S. Cl.
CPC ... *G09G 3/3258* (2013.01); *G09G 2300/0819* (2013.01); *G09G 2300/0861* (2013.01);
(Continued)

(58) Field of Classification Search
CPC ............... G09G 3/3233; G09G 3/3258; G09G 2320/045; G09G 2300/0819;
(Continued)

(56) References Cited

U.S. PATENT DOCUMENTS 10,991,303 B2 * 4/2021 Lee ........................ G09G 3/325
11,380,261 B2 * 7/2022 Wang ..................... G09G 3/325
(Continued)

FOREIGN PATENT DOCUMENTS

CN 103137067 A 6/2013
CN 104282266 A 1/2015
(Continued)

OTHER PUBLICATIONS

PCT/CN2021/130055 international search report and written opinion.

*Primary Examiner* — Doon Y Chow
(74) *Attorney, Agent, or Firm* — IPro, PLLC

(57) ABSTRACT

The present disclosure provides a pixel circuit. The pixel circuit includes a light emitting element, an energy storage circuit, a driving circuit, a data writing-in circuit, a compensation control circuit, an initialization circuit and a light emitting control circuit. The compensation control circuit is configured to control to connect the control terminal of the driving circuit and the first terminal of the driving circuit under the control of a first control signal. The driving circuit is configured to generate a driving current for driving the light emitting element to emit light under the control of a potential of the control terminal of the driving circuit.

18 Claims, 13 Drawing Sheets

(52) U.S. Cl.
CPC . *G09G 2310/08* (2013.01); *G09G 2320/0233* (2013.01); *G09G 2320/041* (2013.01)

(58) Field of Classification Search
CPC ... G09G 2320/0233; G09G 2310/0251; G09G 2300/0842; G09G 2320/041; G09G 2310/08; G09G 2300/0426; G09G 2300/0861
See application file for complete search history.

(56) References Cited

U.S. PATENT DOCUMENTS

| | | | | |
|---|---|---|---|---|
| 11,996,046 | B2* | 5/2024 | Kim | G09G 3/3233 |
| 12,039,935 | B2* | 7/2024 | Kim | G09G 3/3233 |
| 2013/0141316 | A1 | 6/2013 | Lee et al. | |
| 2016/0063921 | A1 | 3/2016 | Tsai et al. | |
| 2016/0155387 | A1* | 6/2016 | Kim | G09G 3/3291 345/76 |
| 2016/0189606 | A1* | 6/2016 | Chen | G09G 3/3233 345/78 |
| 2018/0166021 | A1* | 6/2018 | Xi | G09G 3/3241 |
| 2020/0126478 | A1 | 4/2020 | Lee et al. | |
| 2021/0118368 | A1* | 4/2021 | In | G09G 3/3275 |
| 2021/0407379 | A1* | 12/2021 | Yang | G06F 3/042 |

FOREIGN PATENT DOCUMENTS

| | | | |
|---|---|---|---|
| CN | 105590955 | A | 5/2016 |
| CN | 205541822 | U | 8/2016 |
| CN | 109523956 | A | 3/2019 |
| CN | 112951159 | A | 6/2021 |

* cited by examiner

PIXEL CIRCUIT, PIXEL DRIVING METHOD, DISPLAY SUBSTRATE AND DISPLAY DEVICE

CROSS-REFERENCE TO RELATED APPLICATION

This application is the U.S. national phase of PCT Application No. PCT/CN2021/130055 filed on Nov. 11, 2021, which claims a priority of the Chinese patent application No. 202110194006.7 filed on Feb. 20, 2021, which is incorporated herein by reference in its entirety.

TECHNICAL FIELD

The present disclosure relates to the field of display technology, in particular to a pixel circuit, a pixel driving method, a display substrate and a display device.

BACKGROUND

In the related art, the preparation of Organic Light Emitting Diode (OLED) display plane is easily affected by factors such as process instability, foreign matter, temperature, etc., which in turn leads to the shift of the threshold voltage of the driving transistor in the pixel circuit. Under certain conditions, the degree of turning on of the driving transistor is uneven, which easily leads to different currents through the organic light emitting diodes, and the problem of uneven brightness of the OLED display screen will occur. A related pixel circuit in a display panel that can improve the brightness uniformity of the display panel has the problems of using a large number of transistors and control lines, high power consumption and inconvenient wiring.

SUMMARY

In a first aspect, the present disclosure provides in some embodiments a pixel circuit, including a light emitting element, an energy storage circuit, a driving circuit, a data writing-in circuit, a compensation control circuit, an initialization circuit and a light emitting control circuit, wherein, the compensation control circuit is electrically connected to a first control line, a control terminal of the driving circuit and a first terminal of the driving circuit, respectively, and is configured to control to connect the control terminal of the driving circuit and the first terminal of the driving circuit under the control of a first control signal provided by the first control line; the data writing-in circuit is electrically connected to a second control line, the first terminal of the driving circuit and a data line respectively, and is configured to control to write a data voltage provided by the data line to the first terminal of the driving circuit under the control of a second control signal provided by a second control line; the initialization circuit is respectively electrically connected to the second control line, the control terminal of the driving circuit and a second terminal of the driving circuit, and is configured to control to connect the control terminal of the driving circuit and the second terminal of the driving circuit under the control of the second control signal; the light emitting control circuit is respectively electrically connected to the second control line, a third control line, a first voltage line, the first terminal of the driving circuit, the second terminal of the driving circuit and a first electrode of the light emitting element, and is configured to control to connect the first voltage line and the first terminal of the driving circuit under the control of the second control signal, and control to connect the second terminal of the driving circuit and the first electrode of the light emitting element and connect a second electrode of the light emitting element to the second voltage line under the control of a third control signal provided by the third control line; a first terminal of the energy storage circuit is electrically connected to the first voltage line, and a second terminal of the energy storage circuit is electrically connected to the control terminal of the driving circuit, the energy storage circuit is configured to store electrical energy; the driving circuit is configured to generate a driving current for driving the light emitting element to emit light under the control of a potential of the control terminal of the driving circuit.

Optionally, the compensation control circuit comprises a first transistor; a control electrode of the first transistor is electrically connected to the first control line, a first electrode of the first transistor is electrically connected to the first terminal of the driving circuit, and a second electrode of the first transistor is electrically connected to the control terminal of the driving circuit.

Optionally, the initialization circuit comprises a second transistor; a control electrode of the second transistor is electrically connected to the second control line, a first electrode of the second transistor is electrically connected to the control terminal of the driving circuit, and a second electrode of the second transistor is electrically connected to the second terminal of the driving circuit.

Optionally, the driving circuit comprises a third transistor, the data writing-in circuit comprises a fourth transistor; the energy storage circuit comprises a storage capacitor; a control electrode of the third transistor is the control terminal of the driving circuit, a first electrode of the third transistor is the first terminal of the driving circuit, and a second electrode of the third transistor is the second terminal of the driving circuit end; a control electrode of the fourth transistor is electrically connected to the second control line, a first electrode of the fourth transistor is electrically connected to the data line, and a second electrode of the fourth transistor is electrically connected to the first electrode of the third transistor; a first electrode plate of the storage capacitor is electrically connected to the first voltage line, and a second electrode plate of the storage capacitor is electrically connected to the control terminal of the driving circuit.

Optionally, the light emitting control circuit includes a fifth transistor and a sixth transistor; a control electrode of the fifth transistor is electrically connected to the second control line, a first electrode of the fifth transistor is electrically connected to the first voltage line, and a second electrode of the fifth transistor is electrically connected to the first terminal of the driving circuit; a control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element.

Optionally, the light emitting element may be an organic light emitting diode; a first electrode of the light emitting element is an anode of the organic light emitting diode, and a second electrode of the light emitting element is a cathode of the organic light emitting diode.

Optionally, the compensation control circuit comprises a first transistor; a control electrode of the first transistor is electrically connected to the first control line, a first electrode of the first transistor is electrically connected to the first terminal of the driving circuit, and a second electrode of the first transistor is electrically connected to the control terminal of the driving circuit; the initialization circuit includes a second transistor; a control electrode of the second transistor is electrically connected to the second control line, a first electrode of the second transistor is electrically connected to the control terminal of the driving circuit, and a second electrode of the second transistor is electrically connected to the second terminal of the driving circuit; the driving circuit includes a third transistor, the data writing-in circuit includes a fourth transistor; the energy storage circuit includes a storage capacitor; a control electrode of the third transistor is the control terminal of the driving circuit, a first electrode of the third transistor is the first terminal of the driving circuit, and a second electrode of the third transistor is the second terminal of the driving circuit; a control electrode of the fourth transistor is electrically connected to the second control line, a first electrode of the fourth transistor is electrically connected to the data line, and a second electrode of the fourth transistor is electrically connected to the first electrode of the third transistor; a first electrode plate of the storage capacitor is electrically connected to the first voltage line, and a second electrode plate of the storage capacitor is electrically connected to the control terminal of the driving circuit; the light emitting control circuit includes a fifth transistor and a sixth transistor; a control electrode of the fifth transistor is electrically connected to the second control line, a first electrode of the fifth transistor is electrically connected to the first voltage line, and a second electrode of the fifth transistor is electrically connected to the first terminal of the driving circuit; a control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element; the first transistor, the second transistor and the fourth transistor are n-type oxide transistors, and the third transistor, the fifth transistor and the sixth transistor are p-type low temperature polysilicon transistors.

In a second aspect, an embodiment of the present disclosure provides a pixel driving method, applied to the pixel circuit, wherein a display period includes an initialization phase, a writing-in phase and a light emitting phase that are set in sequence, the pixel driving method includes: in the initialization phase, the data line providing an initialization voltage, and the data writing-in circuit writing the initialization voltage to the first terminal of the driving circuit under the control of the second control signal, and the compensation control circuit controlling to connect the first terminal of the driving circuit and the control terminal of the driving circuit under the control of the first control signal, and the initialization circuit controlling to connect the control terminal of the driving circuit and the second terminal of the driving circuit under the control of the second control signal, and the light emitting control circuit controlling to connect the second terminal of the driving circuit and the first electrode of the light emitting element under the control of the third control signal, so as to control the initialization of the first electrode of the light emitting element and the control terminal of the driving circuit, so as to clear the residual charge of the first electrode of the light emitting element, so that when the writing-in phase starts, the driving circuit can control to connect the first terminal and the second terminal of the driving circuit; in the writing-in phase, the data line providing a data voltage, and the data writing-in circuit writing the data voltage into the first terminal of the driving circuit under the control of the second control signal, and the compensation control circuit controlling to disconnect the first terminal of the driving circuit from the control terminal of the driving circuit under the control of the first control signal, the initialization circuit controlling to connect the control terminal of the driving circuit and the second terminal of the driving circuit under the control of the second control signal, the driving circuit controlling to connect the first terminal of the driving circuit and the second terminal of the driving circuit under the control of the potential of the control terminal of the driving circuit, to charge the energy storage circuit through the data voltage to change the potential of the control terminal of the driving circuit until the driving circuit disconnects the first terminal of the driving circuit from the second terminal of the driving circuit under the control of the control terminal of the driving circuit; in the light emitting phase, the data writing-in circuit disconnecting the data line from the first terminal of the driving circuit under the control of the second control signal, and the initialization circuit controlling to disconnect the control terminal of the driving circuit from the second terminal of the driving circuit under the control of the second control signal, and the light emitting control circuit controlling to connect the first voltage line and the first terminal of the driving circuit under the control of the second control signal; the light emitting control circuits controlling to connect the second terminal of the driving circuit and the first electrode of the light emitting element under the control of the third control signal, the driving circuit generating a driving current for driving the light emitting element to emit light under the control of the potential of the control terminal of the driving circuit, so as to drive the light emitting element to emit light.

In a third aspect, an embodiment of the present disclosure provides a display substrate, including a base substrate, a plurality of pixel circuits arranged in an array on the base substrate; wherein the pixel circuit further comprises a first a control line, a second control line, a third control line, a data line and a first voltage line; at least a portion of the first voltage line extends along a first direction, and at least a portion of the data line extends along the first direction; at least a portion of the first control line extends along a second direction, at least a portion of the second control line extends along the second direction, and at least a portion of the third control line extends along the second direction; the second control line is arranged between the first control line and the third control line; the first direction intersects the second direction.

Optionally, the compensation control circuit in the pixel circuit includes a first transistor; the initialization circuit in the pixel circuit includes a second transistor, the driving circuit in the pixel circuit includes a third transistor, and the data writing-in circuit in the pixel circuit includes a fourth transistor; the energy storage circuit in the pixel circuit includes a storage capacitor; the light emitting control circuit in the pixel circuit includes a fifth transistor and a sixth transistor; the storage capacitor comprises a first electrode plate and a second electrode plate that are arranged oppositely; the second electrode plate is arranged between the first electrode plate and the base substrate; the source electrode of the third transistor, the source electrode of the fifth transistor, the drain electrode of the third transistor, the source electrode of the sixth transistor, and the drain electrode of the sixth transistor are arranged at the same layer and made of the same material; the source electrode of the third transistor is multiplexed as the drain electrode of the fifth transistor; the source electrode of the first transistor, the drain electrode of the first transistor, the source electrode of the second transistor, the source electrode of the fourth transistor and the drain electrode of the fourth transistor are arranged at the same layer and made of the same material; the source electrode of the first transistor is multiplexed as the drain electrode of the second transistor; the source electrode of the third transistor is arranged between the base substrate and the second electrode plate, and the source electrode of the first transistor is located on the side of the first electrode plate away from the second electrode plate.

In a fourth aspect, the present disclosure provides in some embodiments a display device including the above-mentioned display substrate.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative work shall fall within the protection scope of the present disclosure.

Figure 1:
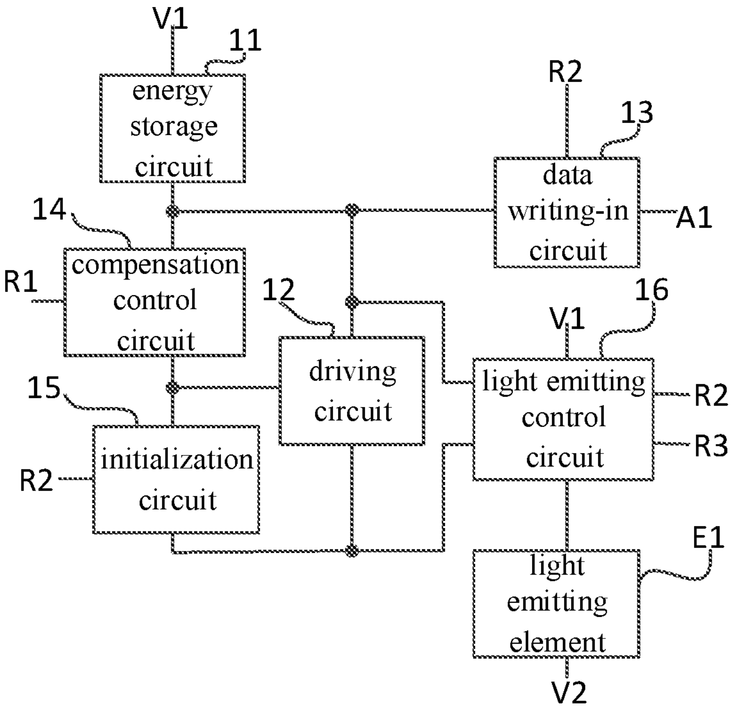
FIG. 1 is a structural diagram of a pixel circuit according to an embodiment of the present disclosure.

As shown in FIG. 1, the pixel circuit according to the embodiment of the present disclosure includes a light emitting element E1, an energy storage circuit 11, a driving circuit 12, a data writing-in circuit 13, a compensation control circuit 14, an initialization circuit 15 and a light emitting control circuit 16, wherein, The compensation control circuit 14 is electrically connected to a first control line R1, a control terminal of the driving circuit 12 and a first terminal of the driving circuit 12, respectively, and is configured to control to connect the control terminal of the driving circuit 12 and the first terminal of the driving circuit 12 under the control of a first control signal provided by the first control line R1;

The data writing-in circuit 13 is electrically connected to a second control line R2, the first terminal of the driving circuit 12 and a data line A1 respectively, and is configured to control to write a data voltage provided by the data line A1 to the first terminal of the driving circuit 12 under the control of a second control signal provided by a second control line R2;

The initialization circuit 15 is respectively electrically connected to the second control line R2, the control terminal of the driving circuit 12 and a second terminal of the driving circuit 12, and is configured to control to connect the control terminal of the driving circuit 12 and the second terminal of the driving circuit 12 under the control of the second control signal;

The light emitting control circuit 16 is respectively electrically connected to the second control line R2, a third control line R3, a first voltage line V1, the first terminal of the driving circuit 12, the second terminal of the driving circuit 12 and a first electrode of the light emitting element E1, and is configured to control to connect the first voltage line V1 and the first terminal of the driving circuit 12 under the control of the second control signal, and control to connect the second terminal of the driving circuit 12 and the first electrode of the light emitting element E1 and connect a second electrode of the light emitting element E1 to the second voltage line V2 under the control of a third control signal provided by the third control line R3;

A first terminal of the energy storage circuit 11 is electrically connected to the first voltage line V1, and a second terminal of the energy storage circuit 11 is electrically connected to the control terminal of the driving circuit 12. The energy storage circuit 11 is configured to store electrical energy;

The driving circuit 12 is configured to generate a driving current for driving the light emitting element E1 to emit light under the control of a potential of the control terminal of the driving circuit.

The pixel circuit according to the embodiment of the present disclosure can reduce the number of transistors, reduce power consumption, and reduce the number of control lines, which is convenient for wiring.

The pixel circuit according to the embodiment of the present disclosure can avoid the influence of the threshold voltage shift of the driving transistor included in the driving circuit on the brightness uniformity of the display panel through internal compensation, and can prevent the first electrode of the light emitting element and the driving circuit from affecting the brightness uniformity of the display panel. The control electrode of the light emitting element is initialized, so as to remove the residual charge of the first electrode of the light emitting element.

When the pixel circuit according to the embodiment of the present disclosure is in operation, the display period may include an initialization phase, a writing-in phase, and a light emitting phase that are set in sequence;

In the initialization phase, the data line A1 provides an initialization voltage, and the data writing-in circuit 13 writes the initialization voltage to the first terminal of the driving circuit 12 under the control of the second control signal, and the compensation control circuit 14 controls to connect the first terminal of the driving circuit 12 and the control terminal 12 of the driving circuit under the control of the first control signal, and the initialization circuit 15 controls to connect the control terminal of the driving circuit 12 and the second terminal of the driving circuit 12 under the control of the second control signal, and the light emitting control circuit 16 controls to connect the second terminal of the driving circuit 12 and the first electrode of the light emitting element E1 under the control of the third control signal, so as to control the initialization of the first electrode of the light emitting element E1 and the control terminal of the driving circuit 12, so as to clear the residual charge of the first electrode of the light emitting element E1, so that when the writing-in phase starts, the driving circuit 12 can control to connect the first terminal and the second terminal of the driving circuit 12;

In the writing-in phase, the data line A1 provides a data voltage, and the data writing-in circuit 13 writes the data voltage to the first terminal of the driving circuit 12 under the control of the second control signal, and the compensation control circuit 14 controls to disconnect the first terminal of the driving circuit 12 from the control terminal of the driving circuit 12 under the control of the first control signal, the initialization circuit 15 controls to connect the control terminal of the driving circuit 12 and the second terminal of the driving circuit 12 under the control of the second control signal, the driving circuit 12 controls to connect the first terminal of the driving circuit 12 and the second terminal of the driving circuit 12 under the control of the potential of the control terminal of the driving circuit, to charge the energy storage circuit through the data voltage to change the potential of the control terminal of the driving circuit 12 until the driving circuit 12 disconnects the first terminal of the driving circuit 12 from the second terminal of the driving circuit under the control of the control terminal of the driving circuit, so that the potential of the control terminal of the driving circuit 12 is related to the threshold voltage of the driving transistor included in the driving circuit 12, and the driving current for driving E1 to emit light is not related to the threshold voltage of the driving transistor in the light emitting phase;

In the light emitting phase, the data writing-in circuit 13 disconnects the data line A1 from the first terminal of the driving circuit 12 under the control of the second control signal, and the initialization circuit 15 controls to disconnect the control terminal of the driving circuit 12 from the second terminal of the driving circuit 12 under the control of the second control signal, and the light emitting control circuit 16 controls to connect the first voltage line V1 and the first terminal of the driving circuit 12 under the control of the second control signal; the light emitting control circuits controls to connect the second terminal of the driving circuit 12 and the first electrode of the light emitting element E1 under the control of the third control signal, the driving circuit 12 generates a driving current for driving the light emitting element E1 to emit light under the control of the potential of the control terminal of the driving circuit, so as to drive the light emitting element E1 to emit light.

In the related art, the brightness uniformity of the display panel is related to the threshold voltage shift of the driving transistor, the residual charge of the first electrode of the light emitting element E1 after emitting light, etc. The pixel circuit according to the embodiment of the present disclosure can avoid the threshold voltage shift of the driving transistor in the driving circuit from affacting the brightness uniformity of the display panel, and can remove the residual charge of the first electrode of the light emitting element in the initialization phase, thereby improving the brightness uniformity of the display panel.

In at least one embodiment of the present disclosure, the first voltage line may be a high voltage line, and the second voltage line may be a low voltage line.

Optionally, the compensation control circuit includes a first transistor;

A control electrode of the first transistor is electrically connected to the first control line, a first electrode of the first transistor is electrically connected to the first terminal of the driving circuit, and a second electrode of the first transistor is electrically connected to the control terminal of the driving circuit.

Optionally, the initialization circuit includes a second transistor;

A control electrode of the second transistor is electrically connected to the second control line, a first electrode of the second transistor is electrically connected to the control terminal of the driving circuit, and a second electrode of the second transistor is electrically connected to the second terminal of the driving circuit.

In at least one embodiment of the present disclosure, the driving circuit may include a third transistor, the data writing-in circuit may include a fourth transistor; the energy storage circuit may include a storage capacitor;

A control electrode of the third transistor is the control terminal of the driving circuit, a first electrode of the third transistor is the first terminal of the driving circuit, and a second electrode of the third transistor is the second terminal of the driving circuit end;

A control electrode of the fourth transistor is electrically connected to the second control line, a first electrode of the fourth transistor is electrically connected to the data line, and a second electrode of the fourth transistor is electrically connected to the first electrode of the third transistor;

A first electrode plate of the storage capacitor is electrically connected to the first voltage line, and a second electrode plate of the storage capacitor is electrically connected to the control terminal of the driving circuit.

Optionally, the light emitting control circuit includes a fifth transistor and a sixth transistor;

A control electrode of the fifth transistor is electrically connected to the second control line, a first electrode of the fifth transistor is electrically connected to the first voltage line, and a second electrode of the fifth transistor is electrically connected to the first terminal of the driving circuit;

A control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element.

Optionally, the light emitting element may be an organic light emitting diode; a first electrode of the light emitting element is an anode of the organic light emitting diode, and a second electrode of the light emitting element is a cathode of the organic light emitting diode.

In a specific implementation, the light emitting element may be an OLED. In this case, the first electrode of the light emitting element is the anode of the OLED, and the second electrode of the light emitting element is the cathode of the OLED.

In at least one embodiment of the present disclosure, the compensation control circuit includes a first transistor;

A control electrode of the first transistor is electrically connected to the first control line, a first electrode of the first transistor is electrically connected to the first terminal of the driving circuit, and a second electrode of the first transistor is electrically connected to the control terminal of the driving circuit;

the initialization circuit includes a second transistor;

A control electrode of the second transistor is electrically connected to the second control line, a first electrode of the second transistor is electrically connected to the control terminal of the driving circuit, and a second electrode of the second transistor is electrically connected to the second terminal of the driving circuit;

The driving circuit includes a third transistor, the data writing-in circuit includes a fourth transistor; the energy storage circuit includes a storage capacitor;

A control electrode of the third transistor is the control terminal of the driving circuit, a first electrode of the third transistor is the first terminal of the driving circuit, and a second electrode of the third transistor is the second terminal of the driving circuit;

A control electrode of the fourth transistor is electrically connected to the second control line, a first electrode of the fourth transistor is electrically connected to the data line, and a second electrode of the fourth transistor is electrically connected to the first electrode of the third transistor;

A first electrode plate of the storage capacitor is electrically connected to the first voltage line, and a second electrode plate of the storage capacitor is electrically connected to the control terminal of the driving circuit;

the light emitting control circuit includes a fifth transistor and a sixth transistor;

A control electrode of the fifth transistor is electrically connected to the second control line, a first electrode of the fifth transistor is electrically connected to the first voltage line, and a second electrode of the fifth transistor is electrically connected to the first terminal of the driving circuit;

A control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element;

The first transistor, the second transistor and the fourth transistor are n-type oxide transistors, and the third transistor, the fifth transistor and the sixth transistor are p-type low temperature polysilicon transistors.

Figure 2:
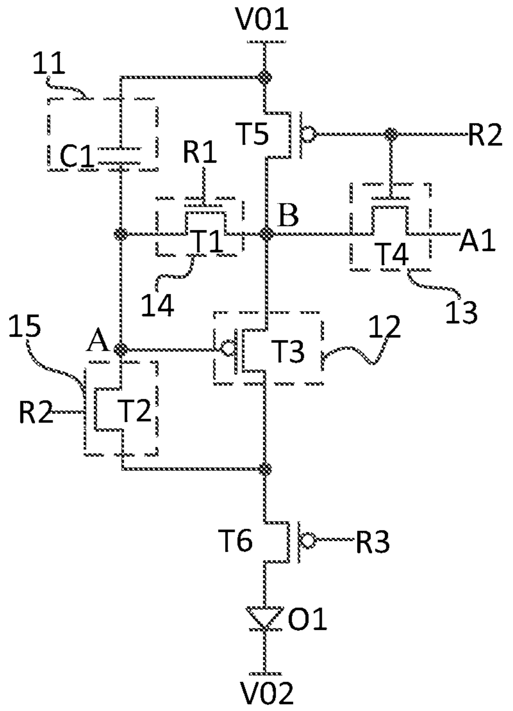
FIG. 2 is a circuit diagram of a pixel circuit according to at least one embodiment of the present disclosure.

As shown in FIG. 2, based on the embodiment of the pixel circuit shown in FIG. 1, the compensation control circuit 14 includes a first transistor T1; the initialization circuit 15 includes a second transistor T2; the driving circuit 12 includes a third transistor T3, the data writing-in circuit 13 includes a fourth transistor T4; the energy storage circuit 11 includes a storage capacitor C1; the light emitting control circuit includes a fifth transistor T5 and a sixth transistor T6; the light emitting element is an organic light emitting element diode O1;

The gate electrode of the first transistor T1 is electrically connected to the first control line R1, the drain electrode of the first transistor T1 is electrically connected to the source electrode of the driving transistor T3, and the source electrode of the first transistor T1 is electrically connected to the gate electrode of the driving transistor T3;

The gate electrode of the second transistor T2 is electrically connected to the second control line R2, the drain electrode of the second transistor T2 is electrically connected to the gate electrode of the driving transistor T3, and the source electrode of the second transistor T2 is electrically connected to the drain electrode of the driving transistor T3;

The gate electrode of the third transistor T3 is the control terminal of the driving circuit 12, the source electrode of the third transistor T3 is the first terminal of the driving circuit 12, and the drain electrode of the third transistor T3 is second terminal of the driving circuit 12;

The gate electrode of the fourth transistor T4 is electrically connected to the second control line R2, the drain electrode of the fourth transistor T4 is electrically connected to the data line A1, and the source electrode of the fourth transistor T4 is electrically connected to the source electrode of the third transistor T3;

The first electrode plate of the storage capacitor C1 is electrically connected to the high-voltage line V01, and the second electrode plate of the storage capacitor C1 is electrically connected to the gate electrode of the driving transistor T3; the high-voltage line V01 is used to provide a high-voltage signal;

The gate electrode of the fifth transistor T5 is electrically connected to the second control line R2, the source electrode of the fifth transistor T5 is electrically connected to the high voltage line V01, and the drain electrode of the fifth transistor T5 is electrically connected to the source electrode of the driving transistor T3;

The gate electrode of the sixth transistor T6 is electrically connected to the third control line R3, the source electrode of the sixth transistor T6 is electrically connected to the drain electrode of the driving transistor T3, and the drain electrode of the sixth transistor T6 is electrically connected to the anode of the organic light emitting diode O1;

The cathode of the organic light emitting diode O1 is electrically connected to the low voltage line V02; the low voltage line V02 is used for providing a low voltage signal.

In at least one embodiment of the pixel circuit shown in FIGS. 2, T1, T2 and T4 are all N-type metal-oxide-semiconductor (NMOS) transistors, and T3, T5 and T6 are all P-type metal-oxide-semiconductor (PMOS) transistors, but not limited thereto.

In at least one embodiment of the pixel circuit shown in FIG. 2, the first node A is a node electrically connected to the gate electrode of T3, and the second node B is a node electrically connected to the source electrode of T3.

Figure 3A:
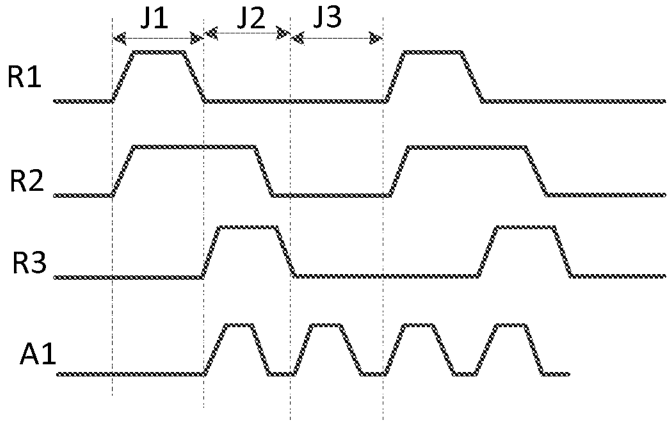
FIG. 3A is a timing diagram of the pixel circuit shown in FIG. 2 according to at least one embodiment of the present disclosure.
Figure 4:
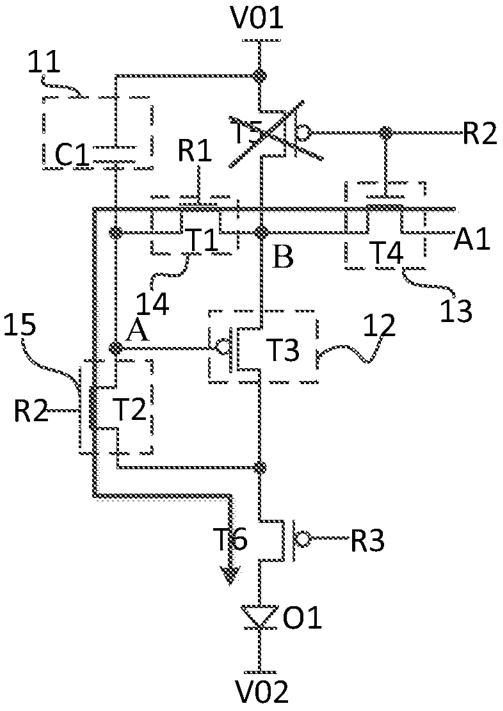
FIG. 4 is a schematic diagram of a working state of the pixel circuit shown in FIG. 2 in an initialization phase according to at least one embodiment of the present disclosure.
Figure 5:
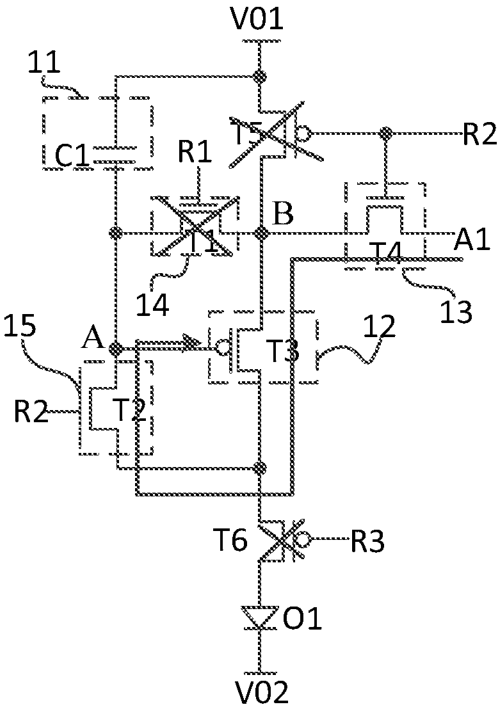
FIG. 5 is a schematic diagram of a working state of the pixel circuit shown in FIG. 2 in a writing-in phase according to at least one embodiment of the present disclosure.
Figure 6:
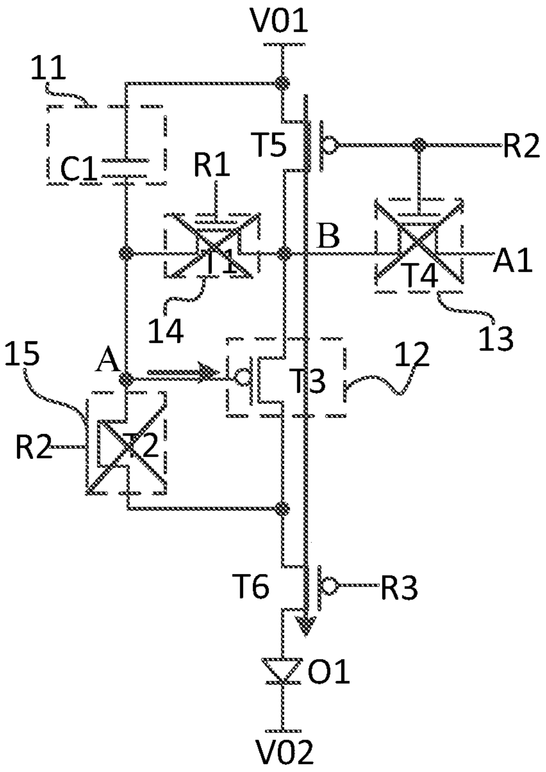
FIG. 6 is a schematic diagram of a working state of the pixel circuit shown in FIG. 2 in the light emitting phase according to at least one embodiment of the present disclosure.

As shown in FIG. 3A, when the pixel circuit shown in FIG. 2 of the present disclosure is in operation, the display period may include an initialization phase J1, a writing-in phase J2 and a light emitting phase J3 that are set in sequence;

In the initialization phase J1, the data line A1 provides an initialization voltage Vi (the initialization voltage Vi is a low voltage signal) to reset the gate electrode of T3, the second electrode plate of C1 and the anode of O1, and R1 and R2 provide high voltage signals, R3 provides a low voltage signal, as shown in FIGS. 4, T1, T2, T4 and T6 are turned on, T5 is turned off, Vi is written into the first node A, and the residual positive charge on the anode of O1 is eliminated, the potential of the second node B is Vi;

In the writing-in phase J2, R1 inputs a low voltage signal, and both R2 and R3 write a high voltage signal, as shown in FIG. 5, so that T2 and T4 are turned on, T1, T5 and T6 are turned off, and the data line A1 provides the data voltage Vd to charge the first node A through Vd until the potential of the first node A is Vd+Vth, T3 is turned off, and the potential of the second node B is Vd. At this time, T3 is turned off and in an OFF-Bais state, which can effectively improve the problem of display screen mura (uneven display brightness);

In the light emitting phase J3, R1, R2 and R3 input low voltage signals, as shown in FIGS. 6, T5 and T6 are turned on, T1, T2 and T4 are turned off, the voltage of the first node A is Vd+Vth, and the potential of the second node B is V01, the current I flowing through O1 is equal to 0.5K (Vd−V01) 2, and I is not related to Vth; where Vth is the threshold voltage of T3.

Figure 3B:
FIG. 3B is a simulation timing diagram of the pixel circuit shown in FIG. 2 according to at least one embodiment of the present disclosure.

FIG. 3B is a simulation timing diagram of the pixel circuit shown in FIG. 2. In FIG. 3B, the potential of the gate electrode of T3 is labeled V(A), and I1 is the current flowing through O1.

Figure 3C:
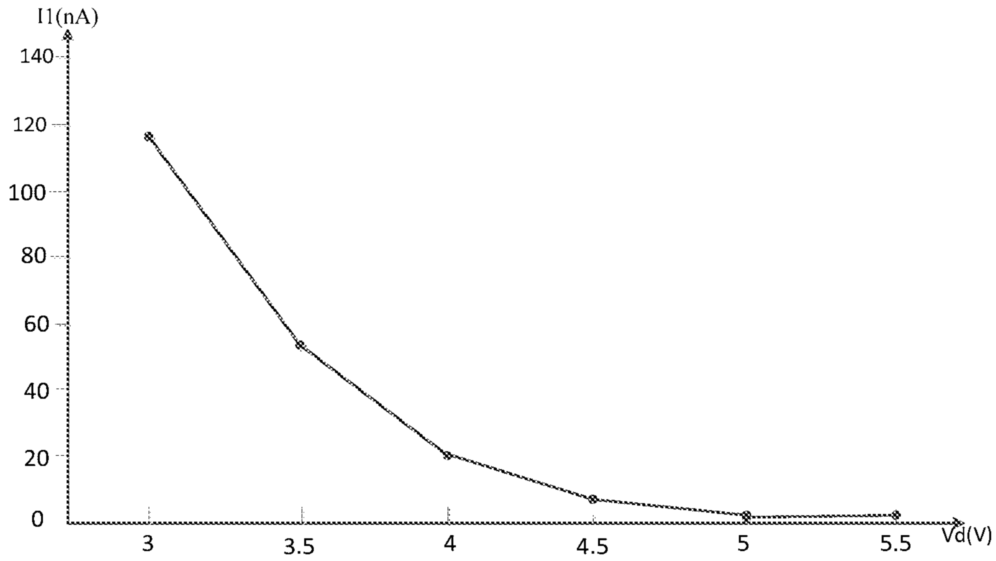
FIG. 3C is a schematic diagram of the current I1 flowing through O1 in a light emitting phase J3 when the pixel circuit shown in FIG. 2 in operation, the threshold voltage of the third transistor T3 is −3V, and the data voltage Vd is in a range of 3V to 5.5V.

FIG. 3C is a schematic diagram of the current I1 flowing through O1 in the light emitting phase J3 when the threshold voltage of the third transistor T3 is −3V and the data voltage Vd is in the range of 3V to 5.5V;

When the threshold voltages of T3 are 0V, −2V and −2.5V, respectively, and the data voltage Vd is in the range of 3V to 5.5V, the schematic diagram of the current I1 flowing through O1 in the light emitting phase J3 approximately coincides with the schematic diagram in FIG. 3C, that is, I1 is less affected by the drift of Vth.

In FIG. 3C, the horizontal axis is the data voltage Vd, the unit is V (volts), and the vertical axis is I1, the unit is nA.

Figure 3D:
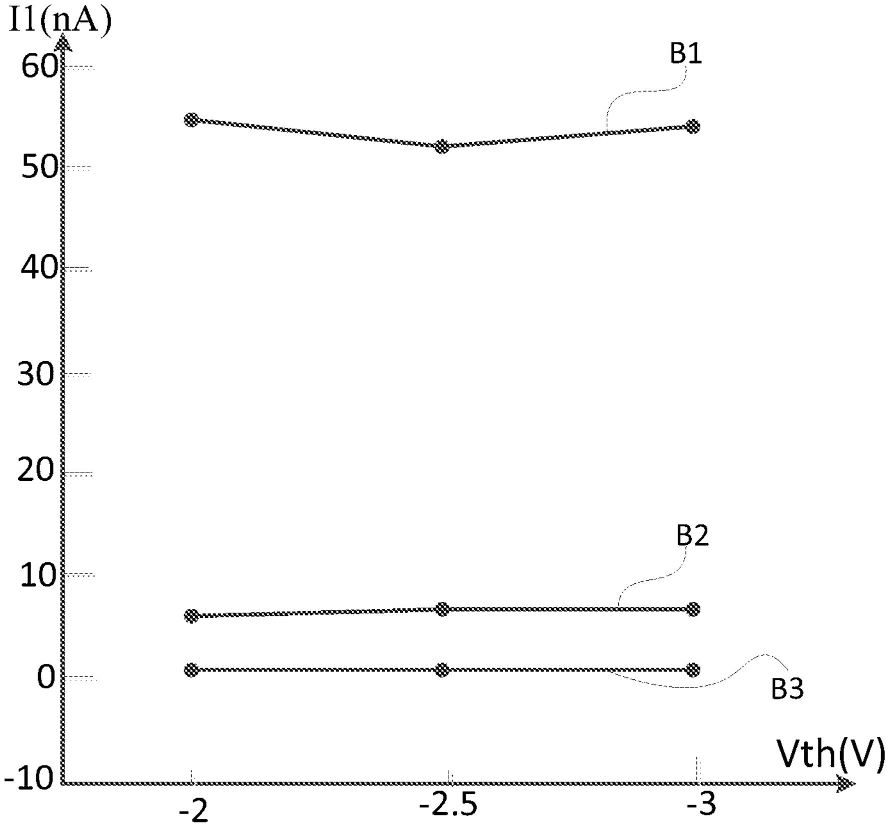
FIG. 3D is a schematic diagram of the first curve B1, the second curve B2, and the third curve B3.

In FIG. 3D, the first curve is labeled B1, the second curve is labeled B2, and the third curve is labeled B3;

The first curve B1 is a schematic diagram of the relationship between the current I1 flowing through O1 in in the light emitting phase J3 and the threshold voltage Vth of T3 when the data voltage is 3.5V;

The second curve B2 is a schematic diagram of the relationship between the current I1 flowing through O1 in in the light emitting phase J3 and the threshold voltage Vth of T3 when the data voltage is 4.5V;

The third curve B3 is a schematic diagram of the relationship between the current I1 flowing through O1 in in the light emitting phase J3 and the threshold voltage Vth of T3 when the data voltage is 5.5V;

It can be known from B1, B2 and B3 that when the data voltages are at various values, and the threshold voltages of the third transistor T3 are at different values, the maximum current fluctuation of I1 is within the range of 0.25%.

In FIG. 3D, the horizontal axis is the threshold voltage Vth of T3, the unit is V (volts), and the vertical axis is I1, the unit is nA.

The pixel driving method according to the embodiment of the present disclosure is applied to the above-mentioned pixel circuit, and the display period includes an initialization phase, a writing-in phase and a light emitting phase that are set in sequence, and the pixel driving method includes:

In the initialization phase, the data line providing an initialization voltage, and the data writing-in circuit writing the initialization voltage to the first terminal of the driving circuit under the control of the second control signal, and the compensation control circuit controlling to connect the first terminal of the driving circuit and the control terminal of the driving circuit under the control of the first control signal, and the initialization circuit controlling to connect the control terminal of the driving circuit and the second terminal of the driving circuit under the control of the second control signal, and the light emitting control circuit controlling to connect the second terminal of the driving circuit and the first electrode of the light emitting element under the control of the third control signal, so as to control the initialization of the first electrode of the light emitting element and the control terminal of the driving circuit, so as to clear the residual charge of the first electrode of the light emitting element, so that when the writing-in phase starts, the driving circuit can control to connect the first terminal and the second terminal of the driving circuit;

In the writing-in phase, the data line providing a data voltage, and the data writing-in circuit writing the data voltage into the first terminal of the driving circuit under the control of the second control signal, and the compensation control circuit controlling to disconnect the first terminal of the driving circuit from the control terminal of the driving circuit under the control of the first control signal, the initialization circuit controlling to connect the control terminal of the driving circuit and the second terminal of the driving circuit under the control of the second control signal, the driving circuit controlling to connect the first terminal of the driving circuit and the second terminal of the driving circuit under the control of the potential of the control terminal of the driving circuit, to charge the energy storage circuit through the data voltage to change the potential of the control terminal of the driving circuit until the driving circuit disconnects the first terminal of the driving circuit from the second terminal of the driving circuit under the control of the control terminal of the driving circuit;

In the light emitting phase, the data writing-in circuit disconnecting the data line from the first terminal of the driving circuit under the control of the second control signal, and the initialization circuit controlling to disconnect the control terminal of the driving circuit from the second terminal of the driving circuit under the control of the second control signal, and the light emitting control circuit controlling to connect the first voltage line and the first terminal of the driving circuit under the control of the second control signal; the light emitting control circuits controlling to connect the second terminal of the driving circuit and the first electrode of the light emitting element under the control of the third control signal, the driving circuit generating a driving current for driving the light emitting element to emit light under the control of the potential of the control terminal of the driving circuit, so as to drive the light emitting element to emit light.

The pixel driving method described in the embodiment of the present disclosure can avoid the influence of the threshold voltage shift of the driving transistor included in the driving circuit on the brightness uniformity of the display panel through internal compensation, and the first electrode of the light emitting element and the control terminal of the driving circuit are initialized to clear the residual charge of the first electrode of the light emitting element.

Figure 7:
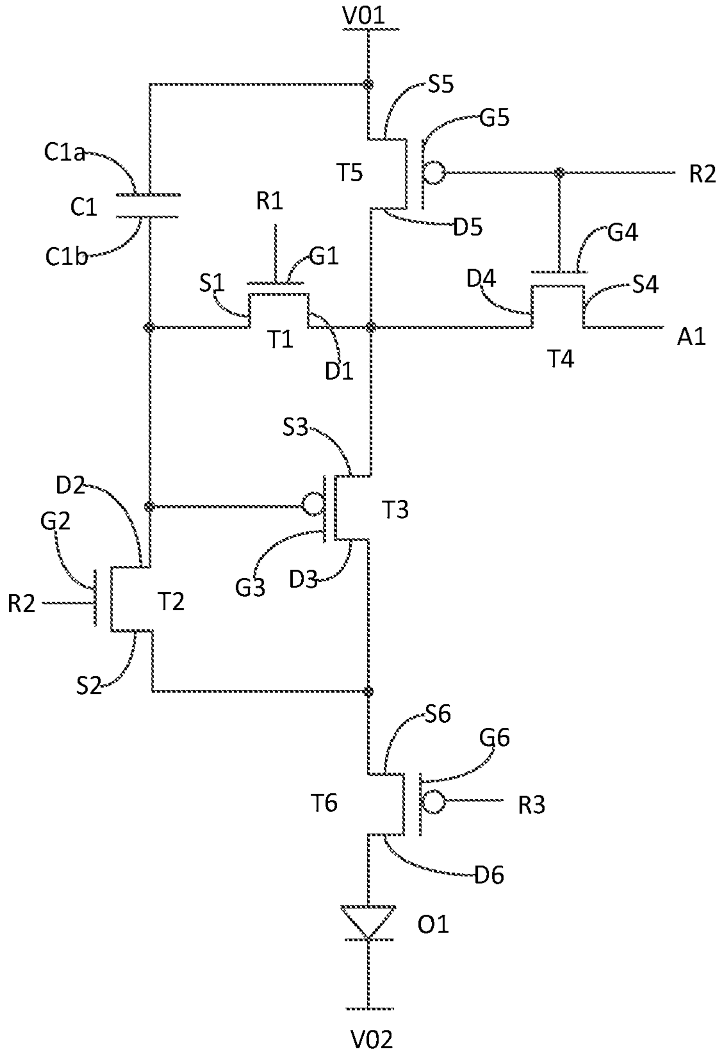
FIG. 7 is a schematic diagram of numbering the electrodes of each transistor and the electrode plates of the storage capacitor on the basis of the pixel circuit shown in FIG. 2.

As shown in FIG. 7, on the basis of at least one embodiment of the pixel circuit shown in FIG. 2, the electrodes of the transistors and the electrode plates of the storage capacitors are numbered;

In FIG. 7, the gate electrode of T1 is labeled G1, the source electrode of T1 is labeled S1, the drain electrode of T1 is labeled D1; the gate electrode of T2 is labeled G2, the source electrode of T2 is labeled S2, the drain electrode of T2 is labeled D2; the gate electrode of T3 is labeled G3, the source electrode of T3 is labeled S3, the drain electrode of T3 is labeled D3; the gate electrode of T4 is labeled G4, the source electrode of T4 is labeled S4, the drain electrode of T4 is labeled D4; the gate electrode of T5 is labeled G5, the source electrode of T5 is labeled S5, the drain electrode of T5 is labeled D5; the gate electrode of T6 is labeled G6, the source electrode of T6 is labeled S6, the drain electrode of T6 is labeled D6; the first electrode plate of C1 is labeled C1*a*, the second electrode plate of C1 is labeled C1*b* is.

Figure 8:
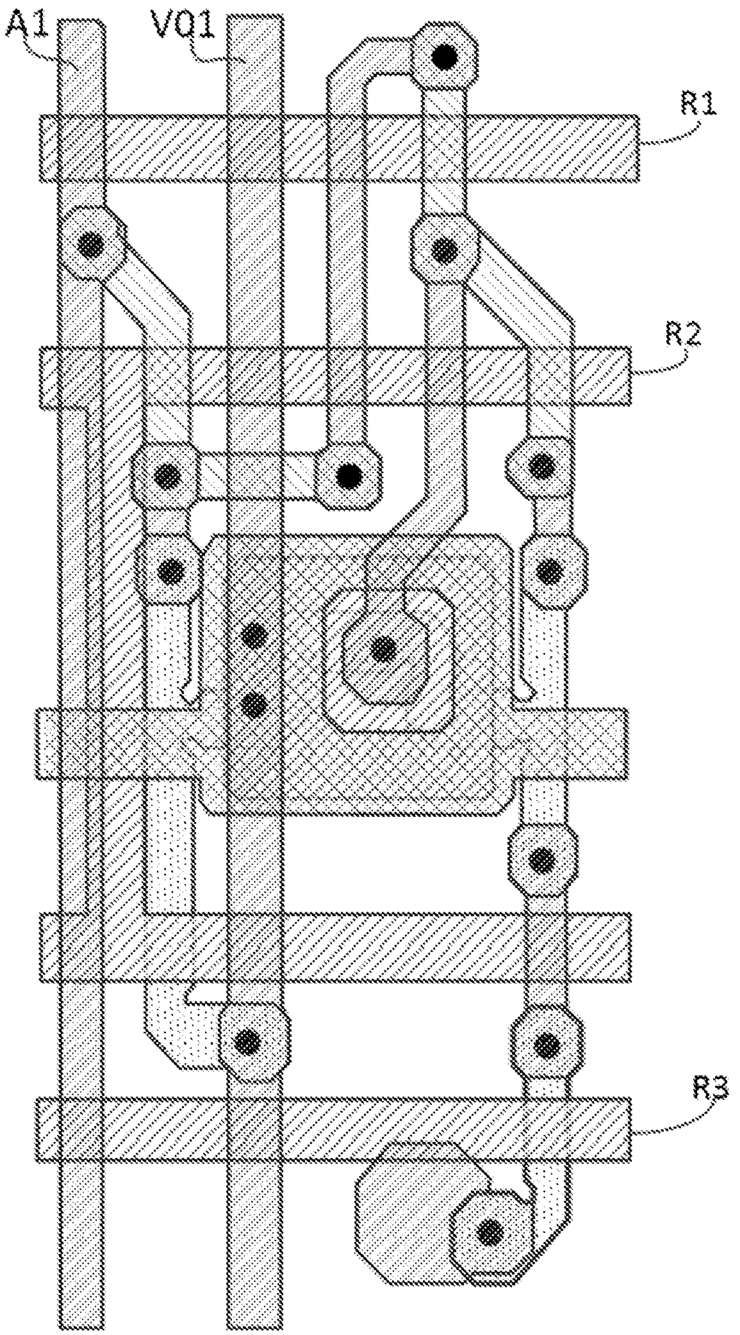
FIG. 8 is a schematic diagram of a layout of a pixel circuit according to an embodiment of the present disclosure.
Figure 9:
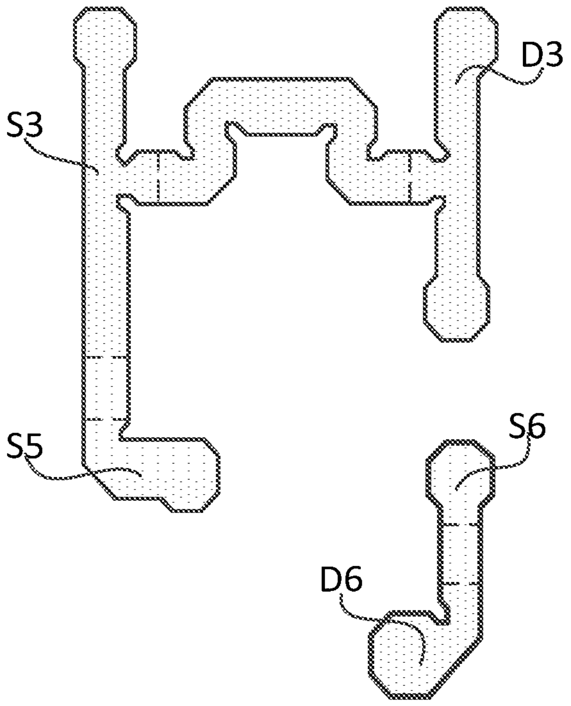
FIG. 9 is the schematic diagram of the first active layer in FIG. 8.
Figure 10:
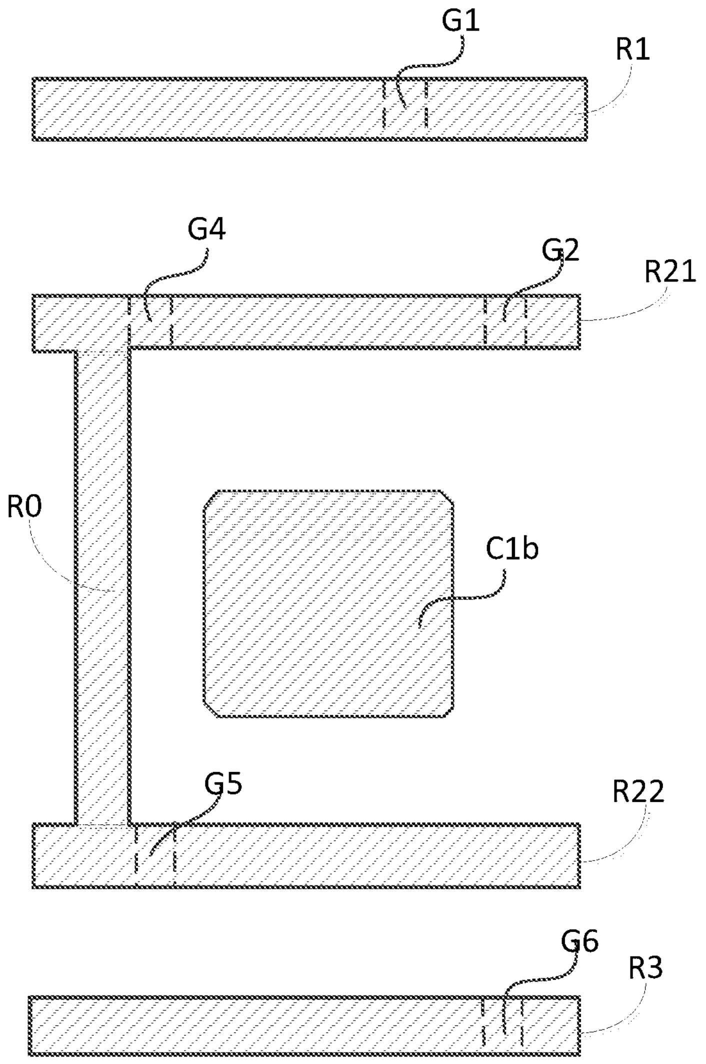
FIG. 10 is a schematic diagram of the first gate metal layer in FIG. 8.
Figure 11:
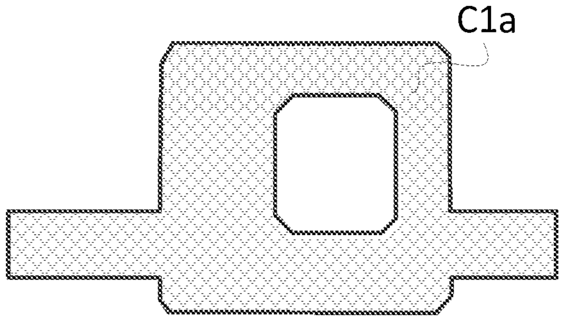
FIG. 11 is a schematic diagram of the second gate metal layer in FIG. 8.
Figure 12:
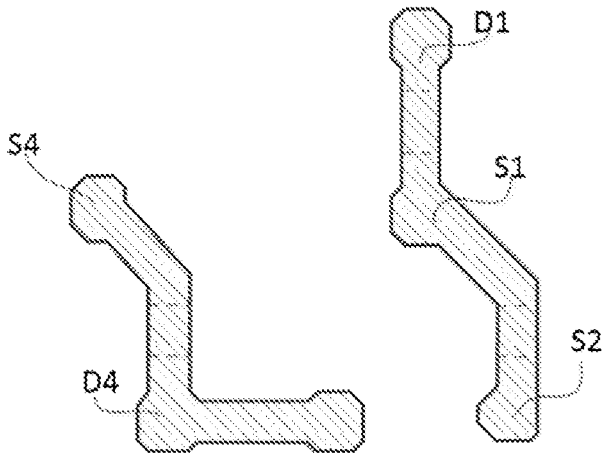
FIG. 12 is a schematic diagram of the second active layer in FIG. 8.
Figure 13:
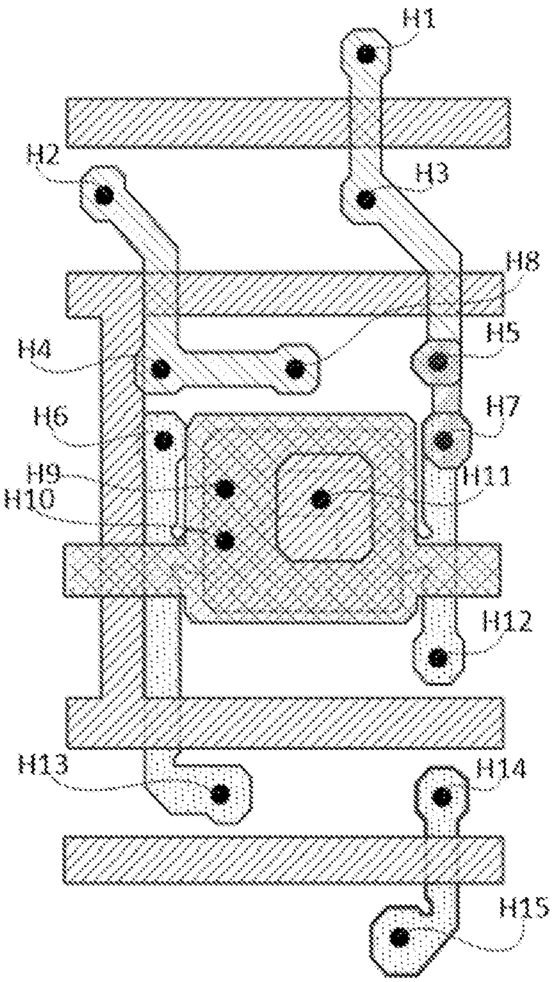
FIG. 13 is a schematic diagram of the via hole in FIG. 8 (in FIG. 13, the source-drain metal layer is not arranged)
Figure 14:
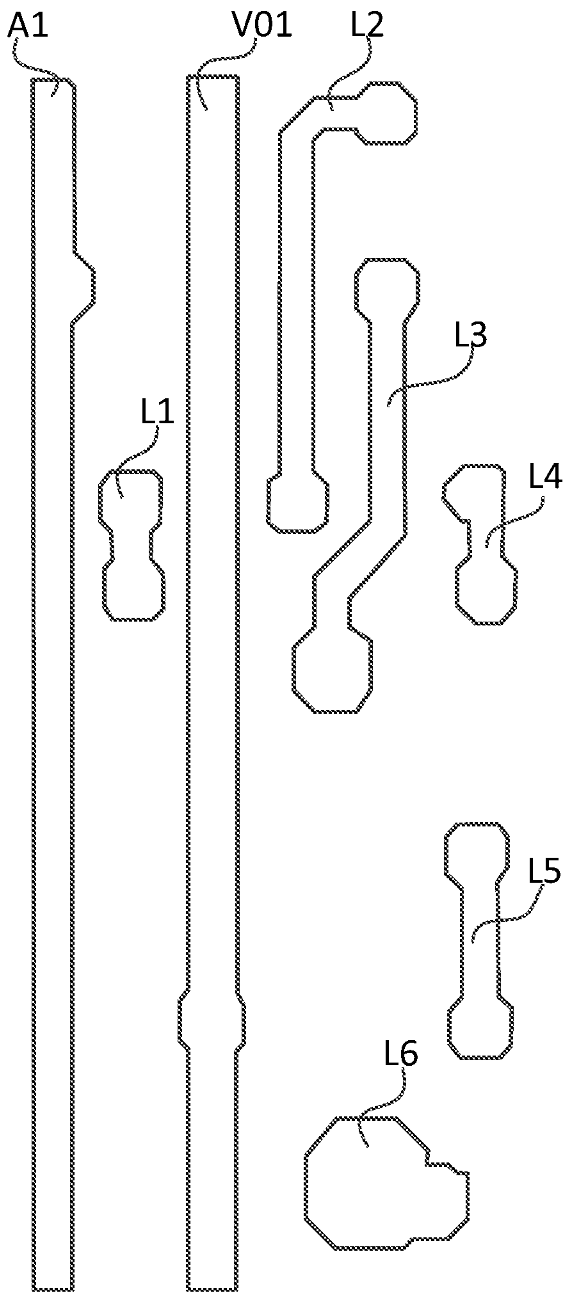
FIG. 14 is a schematic diagram of the source-drain metal layer in FIG. 8.

FIG. 8 shows a schematic diagram of the layout of a pixel circuit according to at least one embodiment of the present disclosure; FIG. 9 is a schematic diagram of the first active layer in FIG. 8, and FIG. 10 is a schematic diagram of the first gate metal layer in FIG. 8, FIG. 11 is a schematic diagram of the second gate metal layer in FIG. 8, FIG. 12 is a schematic diagram of the second active layer in FIG. 8, and FIG. 13 is a schematic diagram of the via hole (in FIG. 13, the source-drain metal layer is not provided), FIG. 14 is a schematic diagram of the source-drain metal layer in FIG. 8.

In FIG. 8, the first control line is labeled R1, the second control line is labeled R2, the third control line is labeled R3, the high voltage line is labeled V01, and the data line is labeled A1.

In a specific implementation, a first active layer, a first gate metal layer, a second gate metal layer, a source-drain metal layer and an anode layer may be sequentially arranged on the substrate to form a display substrate.

In at least one embodiment of the present disclosure, the pixel circuit may include a plurality of transistors; the conductive portions on both sides of the channel portion of each transistor may respectively correspond to the first electrode and the second electrode of the transistor, or may be respectively coupled to the first electrode of the transistor and the second electrode of the transistor.

In at least one embodiment shown in FIGS. 7-14, the first voltage line is a high voltage line V01.

As shown in FIG. 14, both the data line A1 and the high voltage line V01 are formed in the source-drain metal layer, and both A1 and V01 extend along the first direction (in at least one embodiment shown in FIGS. 7-14, the first direction may be the vertical direction).

As shown in FIG. 10, the first control line R1, the second control line R2, the third control line R3 and the second electrode plate C1*b* of C1 are all formed in the first gate metal layer;

R2 is arranged between R1 and R3;

R2 includes a first control line portion R21 extending along the second direction, a second control line portion R22 extending along the second direction, and a connecting portion R0; R21 is electrically connected to R22 through R0;

R1, R3, R21 and R22 all extend along the second direction (in at least one embodiment shown in FIGS. 7-14, the second direction may be a horizontal direction), and R0 extends along the first direction;

C1*b* is arranged between R21 and R22; C1*b* is multiplexed as the gate electrode of T3;

In FIG. 10, G1 is the gate electrode of T1, G2 is the gate electrode of T2, G4 is the gate electrode of T4, G5 is the gate electrode of T5, and G6 is the gate electrode of T5, G6 is the gate electrode of T6;

G1 and R1 can form an integral structure, G2, G4 and R21 can form an integral structure, G5 and R22 can form an integral structure, and G6 and R3 can form an integral structure.

In FIG. 9, the source electrode of T5 is labeled S5; the source electrode of T3 is labeled as S3, the drain electrode of T3 is labeled D3; the source electrode S3 of T3 is multiplexed as the drain electrode of T5;

S6 is the source electrode of T6, D6 is the drain electrode of T6.

As shown in FIG. 9, the source electrode S3 of the third transistor, the source electrode S5 of the fifth transistor, the drain electrode D3 of the third transistor, the source electrode S6 of the sixth transistor and the drain electrode D6 of the sixth transistor are arranged at the same layer and made of the same material; the source electrode S3 of the third transistor is multiplexed as the drain electrode of the fifth transistor.

In FIG. 11, the first electrode plate of C1 is labeled C1*a*, and an opening is provided in C1*a*, so that C1*b* is electrically connected to the source electrode S1 of T1 through the opening;

C1*a* is arranged opposite to C1*b*.

In FIG. 12, the source electrode of T1 is labeled S1, the drain electrode of T1 is labeled D1; S1 is multiplexed as the drain electrode of T2, and S2 is the source electrode of T2; D4 is the drain electrode of T4, S4 is the source electrode of T4.

As shown in FIG. 12, the source electrode S1 of the first transistor, the drain electrode D1 of the first transistor, the source electrode S2 of the second transistor, the source electrode S4 of the fourth transistor and the drain electrode D4 of the fourth transistor are arranged at the same layer and made of the same material; the source electrode S1 of the first transistor is multiplexed as the drain electrode of the second transistor.

In FIG. 13, the first via hole is labeled H1, the second via hole is labeled H2, the third via hole is labeled H3, the fourth via hole is labeled H4, and the fifth via hole is labeled H5, the sixth via hole is labeled H6, the seventh via hole is labeled H7, the eighth via hole is labeled H8, the ninth via is labeled H9, and the tenth via hole is labeled H10, the eleventh via hole is labeled H11, the twelfth via hole is labeled H12, the thirteenth via hole is labeled H13, and the fourteenth via hole is labeled H14, the fifteenth via hole is labeled H15.

In FIG. 14, the data line is labeled A1, the high voltage line is labeled V01, the first conductive connection portion is labeled L1, the second conductive connection portion is labeled L2, the third conductive connection portion is labeled L3, the fourth conductive connection portion is labeled L4; the fifth conductive connection portion is labeled L5, the sixth conductive connection portion is labeled L6.

As shown in FIGS. 8-14, D1 is electrically connected to D4 through a via hole; S1 is electrically connected to L3 through a via hole, and L3 is electrically connected to C1*b* through a via hole, so that S1 is electrically connected to C1*b;*

C1*a* is electrically connected to the high voltage line V01 through a via hole;

S1 is multiplexed as the drain electrode of T2; S2 is electrically connected to L4 through a via hole, and L4 is electrically connected to D3 through a via hole, so that S2 is electrically connected to D3;

S4 is electrically connected to the data line A1 through a via hole, D4 is electrically connected to L1 through a via hole, and L1 is electrically connected to S3 through a via hole, so that S3 is electrically connected to D4;

S5 is electrically connected to the high voltage line V01 through a via hole;

The source electrode S6 of T6 is electrically connected to L5 through the via hole, and L5 is electrically connected to D3 through the via hole, so that S6 is electrically connected to D3;

D6 is electrically connected to L6 through a via hole.

In at least one embodiment as shown in FIGS. 8-14, the first active layer may be made of P-Si (low temperature polysilicon) material, and the second active layer may be made of IGZO (Indium Gallium Zinc Oxide) material.

Figure 15:
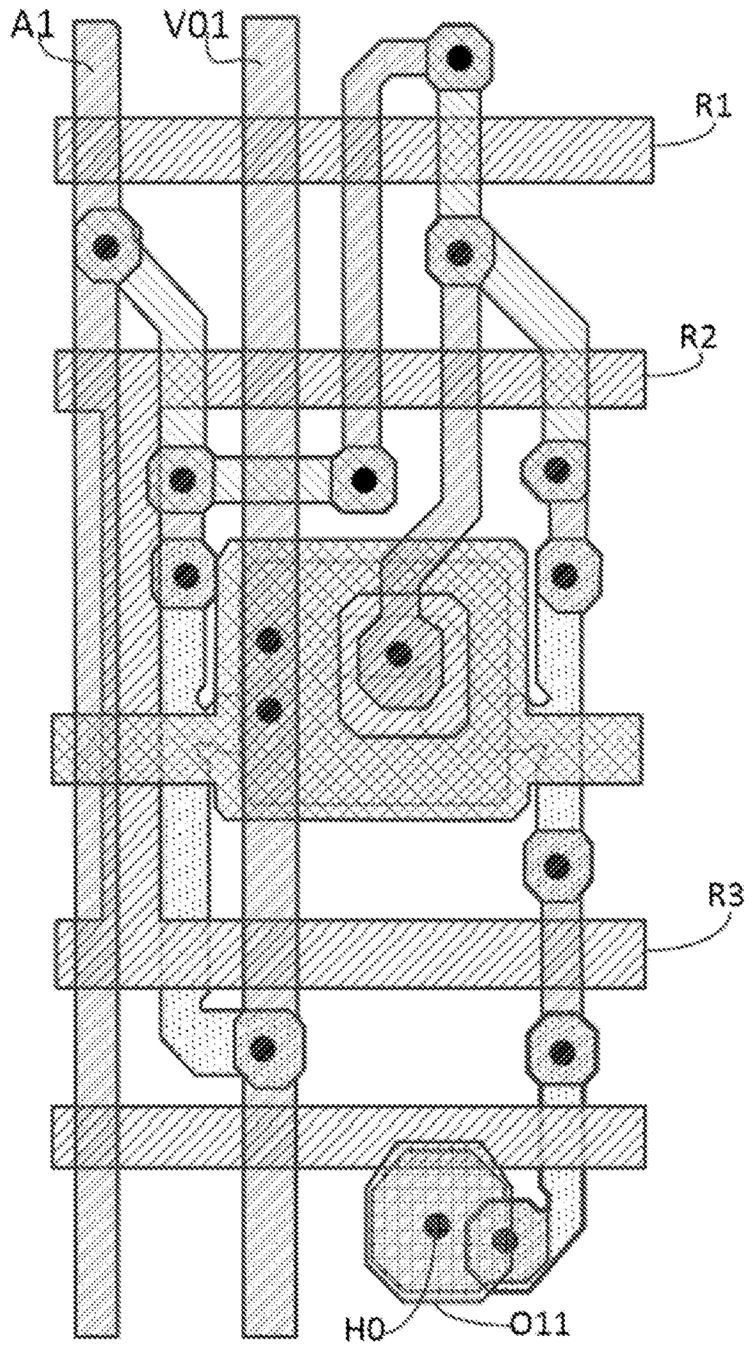
FIG. 15 is a schematic diagram of adding an anode O11 on the basis of at least one embodiment shown in FIG. 8.

As shown in FIG. 15, on the basis of at least one embodiment shown in FIG. 8, an anode O11 is added, and O11 is electrically connected to L6 through a via hole H0, so that O11 is electrically connected to D6.

In at least one embodiment of the present disclosure, O11 is arranged on a side of A1 away from the base substrate, O11 is formed on the anode layer, a planarization layer may be arranged between the anode layer and the source-drain metal layer, and H0 may be a via hole penetrating the planarization layer.

The display substrate according to the embodiment of the present disclosure includes a base substrate, and the display substrate further includes a plurality of the pixel circuits arranged in an array on the base substrate; the pixel circuit further includes a first control line, a second control line, a third control line, a data line and a first voltage line;

At least a portion of the first voltage line extends along a first direction, and at least a portion of the data line extends along the first direction;

at least a portion of the first control line extends along a second direction, at least a portion of the second control line extends along the second direction, and at least a portion of the third control line extends along the second direction;

the second control line is arranged between the first control line and the third control line;

The first direction intersects the second direction.

Exemplarily, the plurality of pixel circuits may be arranged in an array on the base substrate, the plurality of pixel circuits can be divided into a plurality of rows of pixel circuits arranged along the first direction, and each row of pixel circuits includes a plurality of pixel circuits arranged along the second direction. The plurality of pixel circuits can be divided into a plurality of columns of pixel circuits arranged along the second direction, and each column of pixel circuits includes a plurality of pixel circuits arranged along the first direction.

Exemplarily, in the same column of pixel circuits, the first voltage lines included in the pixel circuits may be coupled in sequence to form an integral structure; in the same column of pixel circuits, the data lines included in the pixel circuits may be coupled in sequence to form an integral structure.

Exemplarily, in the same row of pixel circuits, the first control lines included in the pixel circuits may be sequentially coupled to form an integral structure; in the same row of pixel circuits, the second control lines included in the pixel circuits may be sequentially coupled to form an integral structure; in the same row of pixel circuits, the third control lines included in the pixel circuits can be coupled in sequence to form an integral structure.

Optionally, the compensation control circuit in the pixel circuit includes a first transistor; the initialization circuit in the pixel circuit includes a second transistor, the driving circuit in the pixel circuit includes a third transistor, and the data writing-in circuit in the pixel circuit includes a fourth transistor; the energy storage circuit in the pixel circuit includes a storage capacitor; the light emitting control circuit in the pixel circuit includes a fifth transistor and a sixth transistor;

The storage capacitor comprises a first electrode plate and a second electrode plate that are arranged oppositely; the second electrode plate is arranged between the first electrode plate and the base substrate;

The source electrode of the third transistor, the source electrode of the fifth transistor, the drain electrode of the third transistor, the source electrode of the sixth transistor, and the drain electrode of the sixth transistor are arranged at the same layer and made of the same material; the source electrode of the third transistor is multiplexed as the drain electrode of the fifth transistor;

The source electrode of the first transistor, the drain electrode of the first transistor, the source electrode of the second transistor, the source electrode of the fourth transistor and the drain electrode of the fourth transistor are arranged at the same layer and made of the same material; the source electrode of the first transistor is multiplexed as the drain electrode of the second transistor;

The source electrode of the third transistor is arranged between the base substrate and the second electrode plate, and the source electrode of the first transistor is located on the side of the first electrode plate away from the second electrode plate.

In at least one embodiment of the present disclosure, the source electrode of the third transistor, the source electrode of the fifth transistor, the drain electrode of the third transistor, the source electrode of the sixth transistor and the drain electrode of the sixth transistor may all be formed in the first active layer, the source electrode of the first transistor, the drain electrode of the first transistor, the source electrode of the second transistor, the source electrode of the fourth transistor can all be formed in the second active layer, the first active layer can be made of P-Si (low temperature polysilicon) material, and the second active layer can be made of IGZO (Indium Gallium Zinc Oxide) material.

The display device according to the embodiment of the present disclosure includes the above-mentioned display substrate.

The display device provided by the embodiment of the present disclosure may be any product or component with a display function, such as a mobile phone, a tablet computer, a television, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a light emitting element, an energy storage circuit, a driving circuit, a data writing-in circuit, a compensation control circuit, an initialization circuit and a light emitting control circuit, wherein, the compensation control circuit is electrically connected to a first control line, a control terminal of the driving circuit and a first terminal of the driving circuit, respectively, and is configured to control to connect the control terminal of the driving circuit and the first terminal of the driving circuit under the control of a first control signal provided by the first control line;

the data writing-in circuit is electrically connected to a second control line, the first terminal of the driving circuit and a data line respectively, and is configured to control to write a data voltage provided by the data line to the first terminal of the driving circuit under the control of a second control signal provided by a second control line;

the initialization circuit is respectively electrically connected to the second control line, the control terminal of the driving circuit and a second terminal of the driving circuit, and is configured to control to connect the control terminal of the driving circuit and the second terminal of the driving circuit under the control of the second control signal;

the light emitting control circuit is respectively electrically connected to the second control line, a third control line, a first voltage line, the first terminal of the driving circuit, the second terminal of the driving circuit and a first electrode of the light emitting element, and is configured to control to connect the first voltage line and the first terminal of the driving circuit under the control of the second control signal, and control to connect the second terminal of the driving circuit and the first electrode of the light emitting element and connect a second electrode of the light emitting element to the second voltage line under the control of a third control signal provided by the third control line;

a first terminal of the energy storage circuit is electrically connected to the first voltage line, and a second terminal of the energy storage circuit is electrically connected to the control terminal of the driving circuit, the energy storage circuit is configured to store electrical energy;

the driving circuit is configured to generate a driving current for driving the light emitting element to emit light under the control of a potential of the control terminal of the driving circuit.

2. The pixel circuit according to claim 1, wherein the compensation control circuit comprises a first transistor;

a control electrode of the first transistor is electrically connected to the first control line, a first electrode of the first transistor is electrically connected to the first terminal of the driving circuit, and a second electrode of the first transistor is electrically connected to the control terminal of the driving circuit.

3. The pixel circuit according to claim 1, wherein the initialization circuit comprises a second transistor;

a control electrode of the second transistor is electrically connected to the second control line, a first electrode of the second transistor is electrically connected to the control terminal of the driving circuit, and a second electrode of the second transistor is electrically connected to the second terminal of the driving circuit.

4. The pixel circuit according to claim 1, wherein the driving circuit comprises a third transistor, the data writing-in circuit comprises a fourth transistor; the energy storage circuit comprises a storage capacitor;

a control electrode of the third transistor is the control terminal of the driving circuit, a first electrode of the third transistor is the first terminal of the driving circuit, and a second electrode of the third transistor is the second terminal of the driving circuit;

a control electrode of the fourth transistor is electrically connected to the second control line, a first electrode of the fourth transistor is electrically connected to the data line, and a second electrode of the fourth transistor is electrically connected to the first electrode of the third transistor;

a first electrode plate of the storage capacitor is electrically connected to the first voltage line, and a second electrode plate of the storage capacitor is electrically connected to the control terminal of the driving circuit.

5. The pixel circuit according to claim 1, wherein the light emitting control circuit includes a fifth transistor and a sixth transistor;

a control electrode of the fifth transistor is electrically connected to the second control line, a first electrode of the fifth transistor is electrically connected to the first voltage line, and a second electrode of the fifth transistor is electrically connected to the first terminal of the driving circuit;

a control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element.

6. The pixel circuit according to claim 1, wherein the light emitting element is an organic light emitting diode; a first electrode of the light emitting element is an anode of the organic light emitting diode, and a second electrode of the light emitting element is a cathode of the organic light emitting diode.

7. The pixel circuit according to claim 1, wherein the compensation control circuit comprises a first transistor;

a control electrode of the first transistor is electrically connected to the first control line, a first electrode of the first transistor is electrically connected to the first terminal of the driving circuit, and a second electrode of the first transistor is electrically connected to the control terminal of the driving circuit;

the initialization circuit includes a second transistor;

a control electrode of the second transistor is electrically connected to the second control line, a first electrode of the second transistor is electrically connected to the control terminal of the driving circuit, and a second electrode of the second transistor is electrically connected to the second terminal of the driving circuit;

the driving circuit includes a third transistor, the data writing-in circuit includes a fourth transistor; the energy storage circuit includes a storage capacitor;

a control electrode of the third transistor is the control terminal of the driving circuit, a first electrode of the third transistor is the first terminal of the driving circuit, and a second electrode of the third transistor is the second terminal of the driving circuit;

a control electrode of the fourth transistor is electrically connected to the second control line, a first electrode of the fourth transistor is electrically connected to the data line, and a second electrode of the fourth transistor is electrically connected to the first electrode of the third transistor;

a first electrode plate of the storage capacitor is electrically connected to the first voltage line, and a second electrode plate of the storage capacitor is electrically connected to the control terminal of the driving circuit;

the light emitting control circuit includes a fifth transistor and a sixth transistor;

a control electrode of the fifth transistor is electrically connected to the second control line, a first electrode of the fifth transistor is electrically connected to the first voltage line, and a second electrode of the fifth transistor is electrically connected to the first terminal of the driving circuit;

a control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element;

the first transistor, the second transistor and the fourth transistor are n-type oxide transistors, and the third transistor, the fifth transistor and the sixth transistor are p-type low temperature polysilicon transistors.

8. A pixel driving method, applied to the pixel circuit according to claim 1, wherein a display period includes an initialization phase, a writing-in phase and a light emitting phase that are set in sequence, the pixel driving method comprises:

in the initialization phase, the data line providing an initialization voltage, and the data writing-in circuit writing the initialization voltage into the first terminal of the driving circuit under the control of the second control signal, and the compensation control circuit controlling to connect the first terminal of the driving circuit and the control terminal of the driving circuit under the control of the first control signal, and the initialization circuit controlling to connect the control terminal of the driving circuit and the second terminal of the driving circuit under the control of the second control signal, and the light emitting control circuit controlling to connect the second terminal of the driving circuit and the first electrode of the light emitting element under the control of the third control signal, so as to control initialization of the first electrode of the light emitting element and the control terminal of the driving circuit, so as to clear residual charge of the first electrode of the light emitting element, so that when the writing-in phase starts, the driving circuit controls to connect the first terminal and the second terminal of the driving circuit;

in the writing-in phase, the data line providing a data voltage, and the data writing-in circuit writing the data voltage into the first terminal of the driving circuit under the control of the second control signal, and the compensation control circuit controlling to disconnect the first terminal of the driving circuit from the control terminal of the driving circuit under the control of the first control signal, the initialization circuit controlling to connect the control terminal of the driving circuit and the second terminal of the driving circuit under the control of the second control signal, the driving circuit controlling to connect the first terminal of the driving circuit and the second terminal of the driving circuit under the control of the potential of the control terminal of the driving circuit, to charge the energy storage circuit through the data voltage to change the potential of the control terminal of the driving circuit until the driving circuit disconnects the first terminal of the driving circuit from the second terminal of the driving circuit under the control of the control terminal of the driving circuit;

in the light emitting phase, the data writing-in circuit disconnecting the data line from the first terminal of the driving circuit under the control of the second control signal, and the initialization circuit controlling to disconnect the control terminal of the driving circuit from the second terminal of the driving circuit under the control of the second control signal, and the light emitting control circuit controlling to connect the first voltage line and the first terminal of the driving circuit under the control of the second control signal; the light emitting control circuit controlling to connect the second terminal of the driving circuit and the first electrode of the light emitting element under the control of the third control signal, the driving circuit generating a driving current for driving the light emitting element to emit light under the control of the potential of the control terminal of the driving circuit, so as to drive the light emitting element to emit light.

9. A display substrate, comprising a base substrate, a plurality of pixel circuits according to claim 1 arranged in an array on the base substrate; wherein the pixel circuit further comprises a first a control line, a second control line, a third control line, a data line and a first voltage line;

at least a portion of the first voltage line extends along a first direction, and at least a portion of the data line extends along the first direction;

at least a portion of the first control line extends along a second direction, at least a portion of the second control line extends along the second direction, and at least a portion of the third control line extends along the second direction;

the second control line is arranged between the first control line and the third control line;

the first direction intersects the second direction.

10. The display substrate according to claim 9, wherein the compensation control circuit in the pixel circuit includes a first transistor; the initialization circuit in the pixel circuit includes a second transistor, the driving circuit in the pixel circuit includes a third transistor, and the data writing-in circuit in the pixel circuit includes a fourth transistor; the energy storage circuit in the pixel circuit includes a storage capacitor; the light emitting control circuit in the pixel circuit includes a fifth transistor and a sixth transistor;

the storage capacitor comprises a first electrode plate and a second electrode plate that are arranged oppositely; the second electrode plate is arranged between the first electrode plate and the base substrate;

a source electrode of the third transistor, a source electrode of the fifth transistor, a drain electrode of the third transistor, a source electrode of the sixth transistor, and a drain electrode of the sixth transistor are arranged at a same layer and made of a same material; the source electrode of the third transistor is multiplexed as a drain electrode of the fifth transistor;

a source electrode of the first transistor, a drain electrode of the first transistor, a source electrode of the second transistor, a source electrode of the fourth transistor and a drain electrode of the fourth transistor are arranged at a same layer and made of a same material; the source electrode of the first transistor is multiplexed as a drain electrode of the second transistor;

the source electrode of the third transistor is arranged between the base substrate and the second electrode plate, and the source electrode of the first transistor is located on a side of the first electrode plate away from the second electrode plate.

11. A display device comprising the display substrate according to claim 9.

12. The display substrate according to claim 9, wherein the compensation control circuit comprises a first transistor;

a control electrode of the first transistor is electrically connected to the first control line, a first electrode of the first transistor is electrically connected to the first terminal of the driving circuit, and a second electrode of the first transistor is electrically connected to the control terminal of the driving circuit.

13. The display substrate according to claim 9, wherein the initialization circuit comprises a second transistor;

a control electrode of the second transistor is electrically connected to the second control line, a first electrode of the second transistor is electrically connected to the control terminal of the driving circuit, and a second electrode of the second transistor is electrically connected to the second terminal of the driving circuit.

14. The display substrate according to claim 9, wherein the driving circuit comprises a third transistor, the data writing-in circuit comprises a fourth transistor; the energy storage circuit comprises a storage capacitor;

a control electrode of the third transistor is the control terminal of the driving circuit, a first electrode of the third transistor is the first terminal of the driving circuit, and a second electrode of the third transistor is the second terminal of the driving circuit;

a control electrode of the fourth transistor is electrically connected to the second control line, a first electrode of the fourth transistor is electrically connected to the data line, and a second electrode of the fourth transistor is electrically connected to the first electrode of the third transistor;

a first electrode plate of the storage capacitor is electrically connected to the first voltage line, and a second electrode plate of the storage capacitor is electrically connected to the control terminal of the driving circuit.

15. The display substrate according to claim 9, wherein the light emitting control circuit includes a fifth transistor and a sixth transistor;

a control electrode of the fifth transistor is electrically connected to the second control line, a first electrode of the fifth transistor is electrically connected to the first voltage line, and a second electrode of the fifth transistor is electrically connected to the first terminal of the driving circuit;

a control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element.

16. The display substrate according to claim 9, wherein the light emitting element is an organic light emitting diode; a first electrode of the light emitting element is an anode of the organic light emitting diode, and a second electrode of the light emitting element is a cathode of the organic light emitting diode.

17. The display substrate according to claim 9, wherein the compensation control circuit comprises a first transistor;

a control electrode of the first transistor is electrically connected to the first control line, a first electrode of the first transistor is electrically connected to the first terminal of the driving circuit, and a second electrode of the first transistor is electrically connected to the control terminal of the driving circuit;

the initialization circuit includes a second transistor;

a control electrode of the second transistor is electrically connected to the second control line, a first electrode of the second transistor is electrically connected to the control terminal of the driving circuit, and a second electrode of the second transistor is electrically connected to the second terminal of the driving circuit;

the driving circuit includes a third transistor, the data writing-in circuit includes a fourth transistor; the energy storage circuit includes a storage capacitor;

a control electrode of the third transistor is the control terminal of the driving circuit, a first electrode of the third transistor is the first terminal of the driving circuit, and a second electrode of the third transistor is the second terminal of the driving circuit;

a control electrode of the fourth transistor is electrically connected to the second control line, a first electrode of the fourth transistor is electrically connected to the data line, and a second electrode of the fourth transistor is electrically connected to the first electrode of the third transistor;

a first electrode plate of the storage capacitor is electrically connected to the first voltage line, and a second electrode plate of the storage capacitor is electrically connected to the control terminal of the driving circuit;

the light emitting control circuit includes a fifth transistor and a sixth transistor;

a control electrode of the fifth transistor is electrically connected to the second control line, a first electrode of the fifth transistor is electrically connected to the first voltage line, and a second electrode of the fifth transistor is electrically connected to the first terminal of the driving circuit;

a control electrode of the sixth transistor is electrically connected to the third control line, a first electrode of the sixth transistor is electrically connected to the second terminal of the driving circuit, and a second electrode of the sixth transistor is electrically connected to the first electrode of the light emitting element;

the first transistor, the second transistor and the fourth transistor are n-type oxide transistors, and the third transistor, the fifth transistor and the sixth transistor are p-type low temperature polysilicon transistors.

18. A display device comprising the display substrate according to claim 10.

* * * * *